US012632609B2

(12) United States Patent
Bisheh Niasar et al.

(10) Patent No.: US 12,632,609 B2
(45) Date of Patent: May 19, 2026

(54) SECURE NTT AND INTT

(71) Applicant: Microsoft Technology Licensing, LLC, Redmond, WA (US)

(72) Inventors: Mojtaba Bisheh Niasar, Durham, NH (US); Naga Kiranmayee Upadhyayula, Snohomish, WA (US); Emre Karabulut, Redmond, WA (US); Bharat S. Pillilli, El Dorado Hills, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 18/826,616

(22) Filed: Sep. 6, 2024

(65) Prior Publication Data

US 2026/0073081 A1 Mar. 12, 2026

(51) Int. Cl.
*G06F 21/00* (2013.01)
*G06F 21/55* (2013.01)
*G06F 21/75* (2013.01)

(52) U.S. Cl.
CPC ............ *G06F 21/75* (2013.01); *G06F 21/556* (2013.01); *G06F 2221/034* (2013.01)

(58) Field of Classification Search
CPC ... H04L 9/3093; H04L 9/0869; H04L 9/3026; H04L 9/3247; H04L 2209/08; H04L 9/003; H04L 9/0852; G06F 17/144; G06F 21/75; G06F 21/556; G06F 2221/034
See application file for complete search history.

(56) References Cited

U.S. PATENT DOCUMENTS

| | | | | |
|---|---|---|---|---|
| 11,995,184 | B2 * | 5/2024 | Ghosh ...................... | G06F 7/724 |
| 2020/0265167 | A1 * | 8/2020 | Banerjee ............... | H04L 9/0631 |
| 2021/0073316 | A1 * | 3/2021 | Ulrich ........................ | G06F 5/01 |
| 2022/0006630 | A1 * | 1/2022 | Ghosh ................... | H04L 9/0869 |
| 2024/0031140 | A1 * | 1/2024 | Basso ...................... | H04L 9/002 |
| 2024/0413995 | A1 * | 12/2024 | Bisheh Niasar .......... | H04L 9/32 |
| 2025/0123803 | A1 * | 4/2025 | Ohba ...................... | G06F 7/523 |
| 2025/0147732 | A1 * | 5/2025 | Parhi ...................... | G06F 7/722 |
| 2025/0247217 | A1 * | 7/2025 | Niasar ................... | H04L 9/0852 |

OTHER PUBLICATIONS

Extended European search report received for European Application No. 25199443.0, mailed on Dec. 18, 2025, 12 Pages.
Ravi, et al., "On Configurable SCA Countermeasures Against Single Trace Attacks for the NTT: A Performance Evaluation Study over Kyber and Dilithium on the ARM Cortex-M4", Security, Privacy, and Applied Cryptography Engineering, Dec. 21, 2020, 23 Pages.

* cited by examiner

*Primary Examiner* — William A Corum, Jr.
(74) *Attorney, Agent, or Firm* — Schwegman Lundberg & Woessner, P.A.

(57) ABSTRACT

Devices, systems, and methods for secure number theoretic transform (NTT) and inverse NTT (INTT) operations are provided. A circuit includes a memory configured to store polynomial coefficients, butterfly operator circuits coupled to receive the polynomial coefficients and generate, after iterations of operating on the polynomial coefficients, transformed coefficients as outputs, a first subset of the butterfly operator circuits situated in series with each other and in parallel with a second subset of the butterfly operator circuits, and a shuffle circuit coupled between the memory and the butterfly operator circuits, the shuffle circuit configured to change an order in which the polynomial coefficients are provided to the butterfly operator circuits.

16 Claims, 7 Drawing Sheets

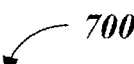

700

770 — STORE, AT A MEMORY, POLYNOMIAL COEFFICIENTS

772 — CONTROL, BY A CONTROLLER COUPLED TO THE MEMORY, WHICH OF THE POLYNOMIAL COEFFICIENTS ARE READ FROM THE MEMORY

774 — SHUFFLE, BY A SHUFFLE CIRCUIT COUPLED BETWEEN THE MEMORY AND BUTTERFLY OPERATOR CIRCUITS, AN ORDER IN WHICH THE POLYNOMIAL COEFFICIENTS ARE PROVIDED TO THE BUTTERFLY OPERATOR CIRCUITS

776 — RECEIVE, BY BUTTERFLY OPERATOR CIRCUITS, THE POLYNOMIAL COEFFICIENTS, A FIRST SUBSET OF THE BUTTERFLY OPERATOR CIRCUITS SITUATED IN SERIES WITH EACH OTHER AND IN PARALLEL WITH A SECOND SUBSET OF THE BUTTERFLY OPERATOR CIRCUITS

778 — GENERATE, AFTER ITERATIONS OF OPERATING ON THE POLYNOMIAL COEFFICIENTS BY THE BUTTERFLY OPERATOR CIRCUITS, TRANSFORMED COEFFICIENTS AS OUTPUTS

780 — CONTROL, BY THE CONTROLLER, WHICH ADDRESSES OF THE MEMORY ARE WRITTEN TO AND STORE THE OUTPUTS, INCLUDING THE TRANSFORMED COEFFICIENTS

*FIG. 7*

SECURE NTT AND INTT

BACKGROUND

Side-Channel Analysis (SCA) attacks pose a significant threat to the security of cryptographic implementations because they exploit some information (e.g., power consumption or electromagnetic radiation) that can be observed from the execution of an algorithm on a device to recover the secret key. SCA attacks can be divided into two main groups: single-trace and multi-trace attacks.

Countermeasures try to reduce the correlation between the targeted secret and captured side-channel measurement, while it also brings overhead on the design. A formal approach to mitigate multi-trace side-channel attacks is to mask the implementation. Masking has a considerable overhead, affecting area, power consumption, latency, and/or throughput by a factor of two or three at least.

SUMMARY

A method, device, system, or a machine-readable medium for SCA protection are provided. A circuit can perform NTT and INTT operations securely. A circuit for number theoretic transform (NTT) or inverse NTT (INTT) can include a memory configured to store polynomial coefficients. The circuit can further include butterfly operator circuits coupled to receive the polynomial coefficients and generate, after iterations of operating on the polynomial coefficients, transformed coefficients as outputs. A first subset of the butterfly operator circuits can be situated in series with each other and in parallel with a second subset of the butterfly operator circuits. The circuit can further include a shuffle circuit coupled between the memory and the butterfly operator circuits, the shuffle circuit configured to change an order in which the polynomial coefficients are provided to the butterfly operator circuits.

The can further include a buffer situated to store the polynomial coefficients in shuffled order. The buffer can include a number of entries, the number of entries sufficient to store polynomial coefficients for multiple iterations of operating the butterfly operator circuits.

The circuit can further include a random number generator configured to generate a random number. The shuffle circuit can use the random number to determine the order in which the polynomial coefficients are provided to the butterfly operator circuits.

The memory can store a plurality of polynomial coefficients in each address thereof. The shuffle circuit can be configured to select, based on the random number, which address of polynomial coefficients is provided to the butterfly operator circuits. The shuffle circuit can be further configured to select, based on the random number, the order in which each polynomial coefficient of the polynomial coefficients is provided to the butterfly operator circuits. The shuffle circuit can include a delay component configured to delay the random number by a specified number of clock cycles. The specified number of clock cycles can be greater than, or equal to, number of clock cycles used by the butterfly operator circuits in generating an output.

A controller can be coupled to the memory. The controller can be configured to control which coefficients are provided to the shuffle circuit and which addresses of the memory store the outputs.

A method for number theoretic transform (NTT) or inverse NTT (INTT) can include storing, at a memory, polynomial coefficients. The method can further include controlling, by a controller coupled to the memory, which of the polynomial coefficients are read from the memory. The method can further include shuffling, by a shuffle circuit coupled between the memory and butterfly operator circuits, an order in which the polynomial coefficients are provided to the butterfly operator circuits. The method can further include receiving, by butterfly operator circuits, the polynomial coefficients, a first subset of the butterfly operator circuits situated in series with each other and in parallel with a second subset of the butterfly operator circuits. The method can further include generating, after iterations of operating on the polynomial coefficients by the butterfly operator circuits, transformed coefficients as outputs. The method can further include controlling, by the controller, which addresses of the memory are written to and store the outputs, including the transformed coefficients.

The method can further include storing, at a buffer, the polynomial coefficients in shuffled order. The buffer can include a number of entries. The number of entries can include a sufficient to store polynomial coefficients for multiple iterations of operating the butterfly operator circuits.

The method can further include generating, by a random number generator, a random number. The shuffle circuit can use the random number to determine the order in which the polynomial coefficients are provided to the butterfly operator circuits. The memory can store a plurality of polynomial coefficients in each address thereof. The method can further include selecting, by the shuffle circuit and based on the random number, which address of polynomial coefficients is provided to the butterfly operator circuits.

The method can further include selecting, by the shuffle circuit and based on the random number, the order in which each polynomial coefficient of the polynomial coefficients is provided to the butterfly operator circuits. The method can further include delaying, by a delay component of the shuffle circuit, the random number by a specified number of clock cycles. The specified number of clock cycles can be greater than, or equal to, number of clock cycles used by the butterfly operator circuits in generating an output.

BRIEF DESCRIPTION OF DRAWINGS

FIG. 7 illustrates, by way of example, a block diagram of an embodiment of a method for secure NTT/INTT operation.

3

Figure 8:
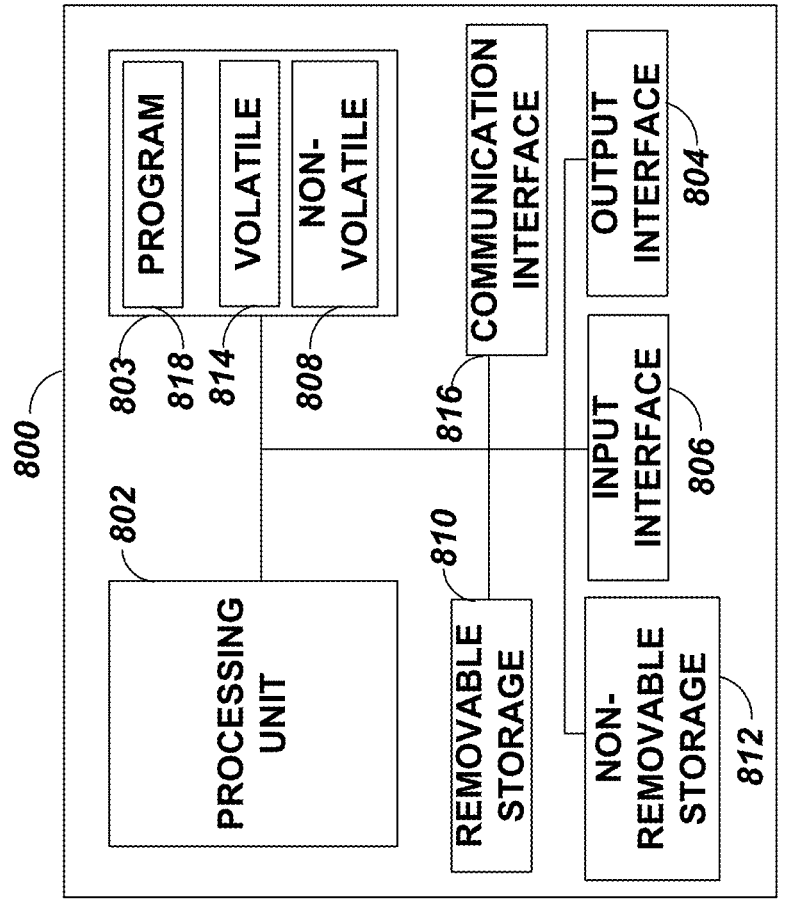

FIG. 8 illustrates, by way of example, a block diagram of an embodiment of a machine (e.g., a computer system) to implement one or more embodiments.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Cloud computing has become an integral part of modern society, offering various services and applications to individuals and organizations. The security of cloud computing is threatened by the advent of quantum computers, which can potentially break the existing public-key cryptosystems, such as Rivest-Shamir-Adleman (RSA) and Elliptic Curve Cryptography (ECC) based on Shor's algorithm. Shor's algorithm is a quantum computer algorithm for finding the prime factors of an integer. Current public-key cryptography is not presently threatened by modern quantum computers. However, cloud resource managers should anticipate the challenge quantum computers pose to modern cryptography and initiate a transition to a postquantum era in a timely manner. In fact, the U.S. government issued a National Security Memorandum in May 2022 that mandated federal agencies to migrate to post-quantum cryptosystems (PQC) by 2035 to mitigate risks to vulnerable cryptographic systems.

A long-term security of cloud computing against quantum attacks can benefit from developing lattice-based cryptosystems, which are among the most promising PQC algorithms that are believed to be hard for both classical and quantum computers. NTT and INTT can be used to achieve more efficient polynomial multiplication in lattice-based cryptosystems. NTT and INTT help reduce algorithm complexity from $0 (n^2)$ to $0(n \log n)$. The complexity of the NTT and INTT computation can benefit from improvement in terms of efficiency so as to help improve operation of the lattice-based cryptosystems.

NTT and INTT operations can be accomplished iteratively. NTT and INTT can be performed by applying a sequence of "butterfly operations" on the input polynomial coefficients. Butterfly operations are arithmetic operations that combine two coefficients of polynomials to obtain two outputs. The NTT and INTT operations can be computed in a logarithmic number of steps using repeated butterfly operations. Traditionally, the utilization of identical butterfly configurations for both NTT and INTT necessitates the implementation of a bit-reverse function. A reconfigurable butterfly architecture provides a new approach for implementing a resource-efficient reconfigurable butterfly core on the hardware platforms. The reconfigurable butterfly architecture can be adjusted (e.g., by changing digital input to the architecture) to different NTT/INTT configurations without needing two separate butterfly cores or paying the extra costs for bit-reversal operations. The reconfigurable butterfly architecture improves the overall effectiveness of polynomial multiplication processes.

To protect NTT and INTT operations performed by butterfly operator circuits, strategic shuffling of inputs is provided. Rather than simply masking all implementation, the shuffling of the inputs to the butterfly operator circuits provides a low-cost solution with high security.

Figures 1, 2:
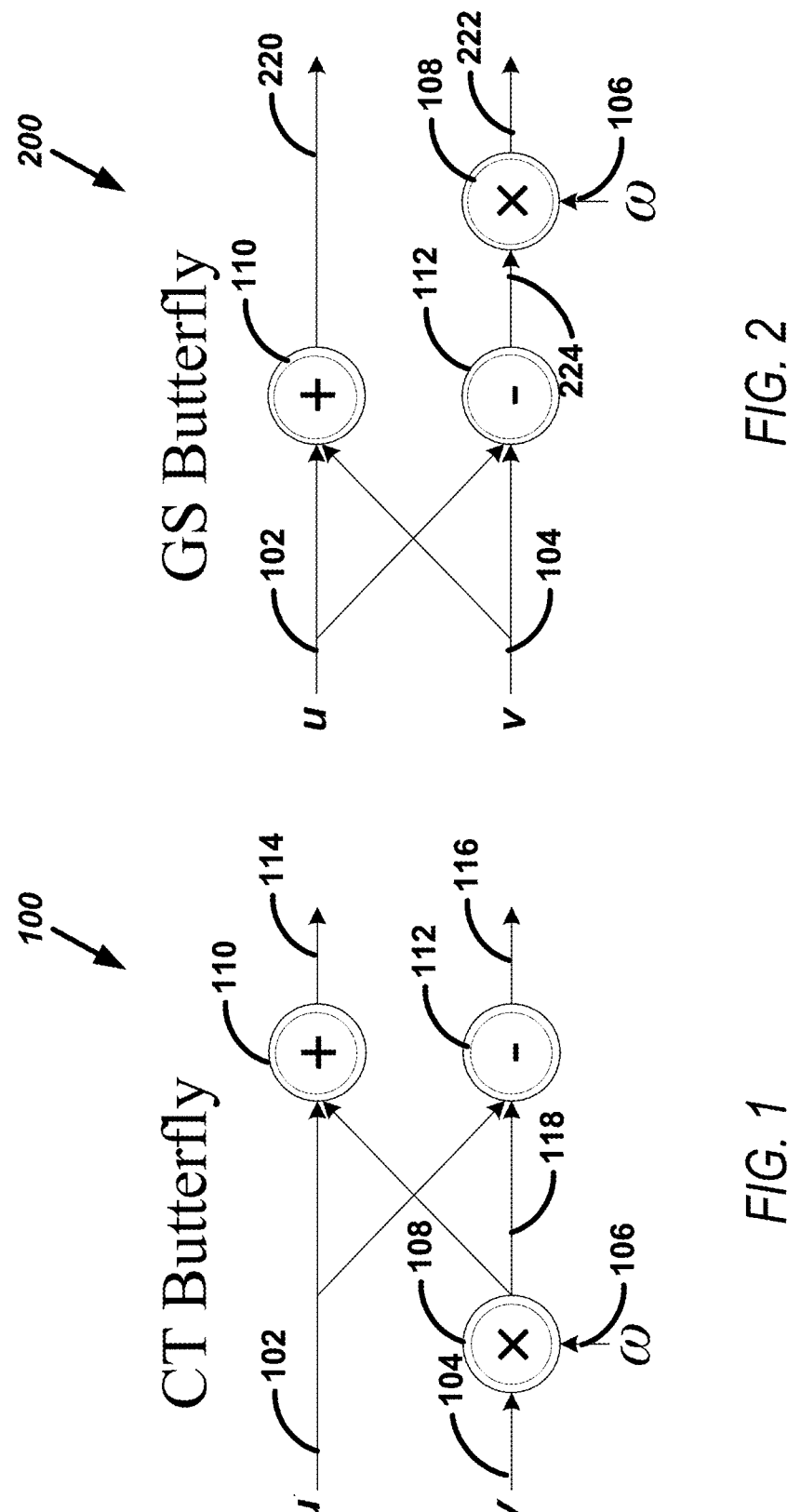
FIG. 1 illustrates, by way of example, a conceptual circuit diagram of an embodiment of a Cooley-Tukey (CT) butterfly operator circuit.
FIG. 2 illustrates, by way of example, a conceptual circuit diagram of an embodiment of a Gentleman-Sande (GS) butterfly operator circuit.

FIG. 1 illustrates, by way of example, a conceptual circuit diagram of an embodiment of a Cooley-Tukey (CT) butterfly operator circuit 100. The circuit 100 performs the CT butterfly operations. The circuit 100 takes, as input u 102 and v 104, which are coefficients of respective polynomials, and ω 106, which is a weight. v 104 and ω 106 are modular multiplied ((v*ω) mod q) using a multiplier 108. A result 118 of the multiplication performed by the multiplier 108 and u 102 are added using a modular adder 110 to generate a first output coefficient 114. The result 118 and u 102 are subtracted using a modular subtractor 112 to generate a second output coefficient 116. The first and second output coefficients 114 and 116 can then be used as inputs, u and v, respectively, in a next iteration of circuit 100 operation.

Pseudocode for an iterative NTT operation using the CT butterfly operator circuit 100 is provided:

In-Place NTT Algorithm using CT Butterfly Operator Circuit

Require: $a(x) \in R_q$, $\omega_n \in \mathbb{Z}_q$, $n=2^l$
Ensure: $\hat{a}(x)=NTT(a) \in R_q$

```
1:      â ← bit − reverse (α)
2:      for i from 1 to l do
3:          m = 2^{l-i}
4:          for j from 0 to 2^{i-1}-1 do
5:              W ← ω_n^{1+j}
6:              for k from 0 to m-1 do
7:                  U ← â[2jm + k]
8:                  V ← â[2jm + k + m] mod q
9:                  T ← V · W
10: ----â[2jm + k] = U + T mod q
11: ----â[2jm + k + m] = U − T mod q
12:             end for
13:         end for
14:     end for
15:     return â(x) ∈ R_q
``` where a is a polynomial and w is a twiddle factor, and n is a number of coefficients in the polynomial.

FIG. 2 illustrates, by way of example, a conceptual circuit diagram of an embodiment of a Gentleman-Sande (GS) butterfly operator circuit 200. The circuit 200 performs the mathematical operations the GS butterfly operation. The circuit 200 takes, as input u 102, v 104, and ω 106. u and v are added mod q, by modular adder 110, resulting in a first output coefficient 220. u 102 and v 104 are subtracted mod q, by modular subtractor 112, resulting in result 224. The result 224 is then multiplied by a weight, ω 106, using a modular multiplier 108. A result of the multiplication performed by the multiplier 108 is a second output coefficient 222. The first and second output coefficients 220 and 222 can then be used as inputs in a next iteration of circuit 200 operation.

What follows is a description of NTT/INTT. Let q be a prime number and $\mathbb{Z}_q$ be the ring of integers modulo q. Define the ring of polynomials for some integer N as $R_q = \mathbb{Z}_q[X]/(X^N+1)$, where the polynomials have n coefficients, each modulo q. Regular font lowercase letters (a) represent single polynomials, bold lowercase letters (a) represent polynomial vectors, and bold uppercase letters (A) to represent a matrix of polynomials. Representations in the NTT domain are represented by (â), (â) and (Â), respectively. Let a and b be polynomial vectors in $R_q$. Let $a \circ b \in R_q$ denote

5 coefficient-wise multiplication of polynomials. The ∘ product of a matrix and a vector is the natural extension of coefficient-wise multiplication of the polynomial vectors.

A naive method of polynomial multiplication has $0(n^2)$ complexity. This complexity can be reduced by using NTT. To multiply two polynomials efficiently in lattice-based cryptography, the polynomial rings of the form $R_q=\mathbb{Z}_q$ $[X]/(X^N+1)$ can be used, where $(X^N+1)$ enables fast polynomial division. The NTT transform maps polynomials to the NTT domain at the cost of $0(n*\log n)$ where multiplying their coefficients results in a polynomial that corresponds to the product of the original polynomials modulo q and $(X^N+1)$. Coefficient-wise multiplication has a complexity of $0(n)$. A total time complexity is thus $0(n\cdot\log n)$.

The NTT is a generalization of a fast Fourier transform (FFT) defined in a finite field. Suppose f is a polynomial of degree n with coefficients in $\mathbb{Z}_q$, as:

$$f = \sum_{i=0}^{n-1} f_i X^i$$

FFT uses the twiddle factor $\omega_n$ n-th root of unity of form $e^{2\pi j/n}$, while NTT has $\omega_n \in \mathbb{Z}_q$ such that $\omega_n$ be a primitive n-th root of unity modulo q, i.e.

$$\omega_n^n = 1 \bmod q.$$

The NTT transforms f, i.e., $\hat{f}=NTT(f)$, is computed as follows for each $i\in\{0,1,\ldots,n-1\}$:

$$\hat{f}_i = \sum_{j=0}^{n-1} f_j\omega_n^{ij}$$

The INTT recovers f from $\hat{f}$ as:

$$f_i = \sum_{j=0}^{n-1} \hat{f}_j\omega_n^{-ij}$$

Hence, the multiplication between two polynomials f and g using NTT can be performed as:

$$f\cdot g=INTT(NTT(f)\circ NTT(g))$$

NTT algorithm is shown in pseudocode elsewhere herein.

The modular addition and modular subtraction of the CT and GS butterfly operator circuits of FIGS. 1 and 2 can be implemented using two, non-modular adders and subtractors. Such a configuration is illustrated in FIG. 3.

Figure 3:
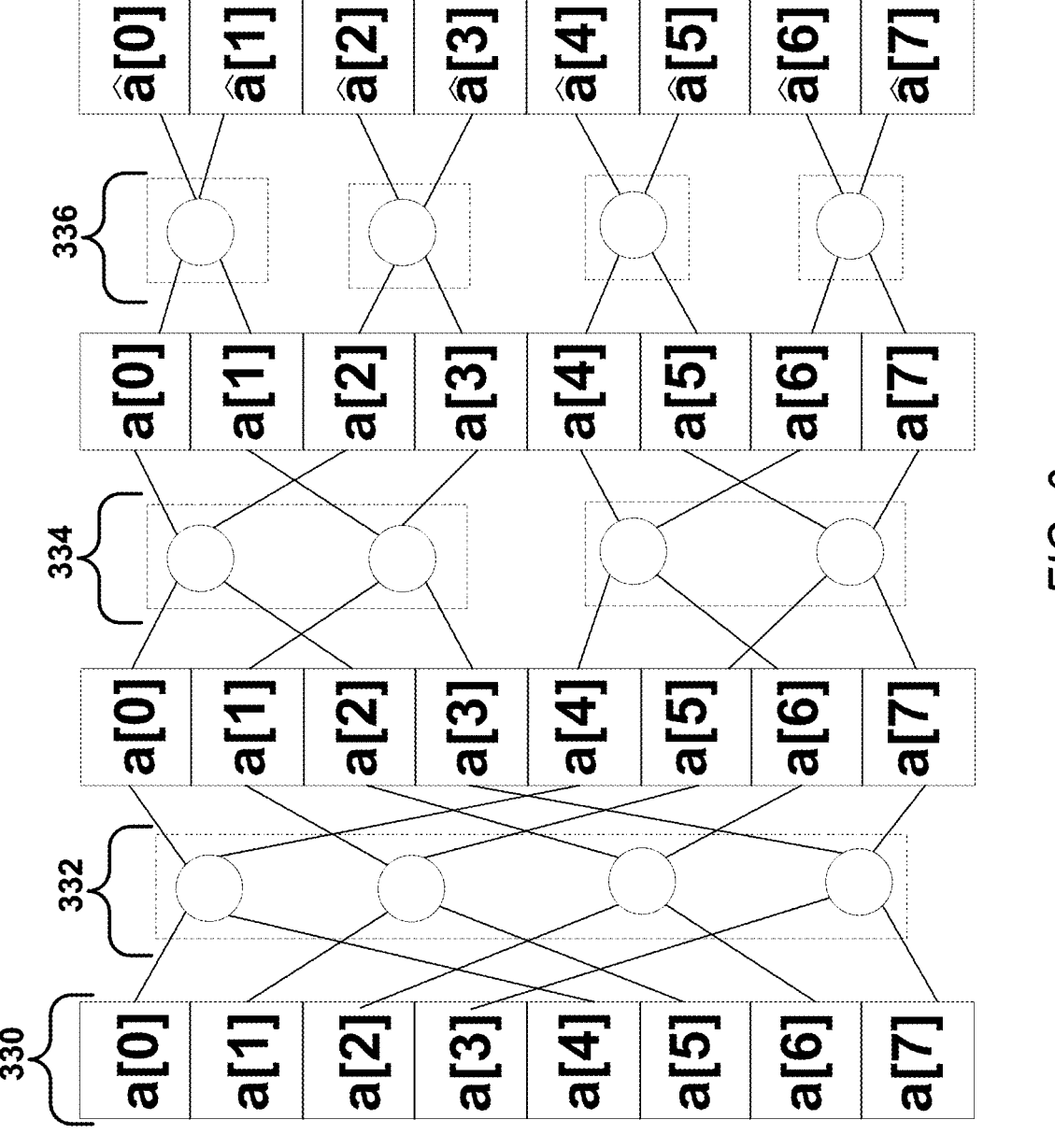
FIG. 3 illustrates, by way of example, a diagram of an embodiment NTT execution flow for a polynomial with 8 coefficients.

FIG. 3 illustrates, by way of example, a diagram of an embodiment NTT execution flow for a polynomial with 8 coefficients. The input is a polynomial having 8 coefficients 330. There are 3 stages 332, 334, 336, and every stage consists of 4 butterfly operator circuits (white circles) where each butterfly operator circuit receives two coefficients and generates 2 coefficients. Each dashed rectangle shows a block in a stage 332, 334,336. For example, the first stage has one block and this block has 4 butterfly operator circuits, while the second stage has 2 blocks and each stage has 2 butterfly operator circuits. In each stage 332, 334, 336, every block has the same number of butterfly operator circuits and this number is represented with "BLC".

Since the input coefficients 330 are either a secret polynomial or public polynomial, such that a public value is multiplied with a secret value, there is a potential for side-channel leakage. As a result, the threat model does not include differential side channel attacks such as differential power analysis (DPA), correlation power analysis (CPA), differential electromagnetic analysis (DEMA), etc.

Shuffling is a countermeasure against side-channel attacks. The input coefficients 330 can be shuffled, such as by shuffling the execution order of the target operation in a way that the attacker struggles to be sure about the obtained secret. This shuffling does not secure individual coefficients but rather obscures the sequential order. For instance, consider a polynomial with five coefficients: x[0]=1, x[1]=−1, x[2]=1, x[3]=1, x[4]=1. If an attacker manages to recover these coefficients but remains unaware of their original order, such that x[i]=1, x[j]=−1, x[k]=1, x[l]=1, x[m]=1 where i, j, k, l, m are unknown and ranging [0,4], the attacker search space becomes factorial(5), which is 120.

Figure 4:
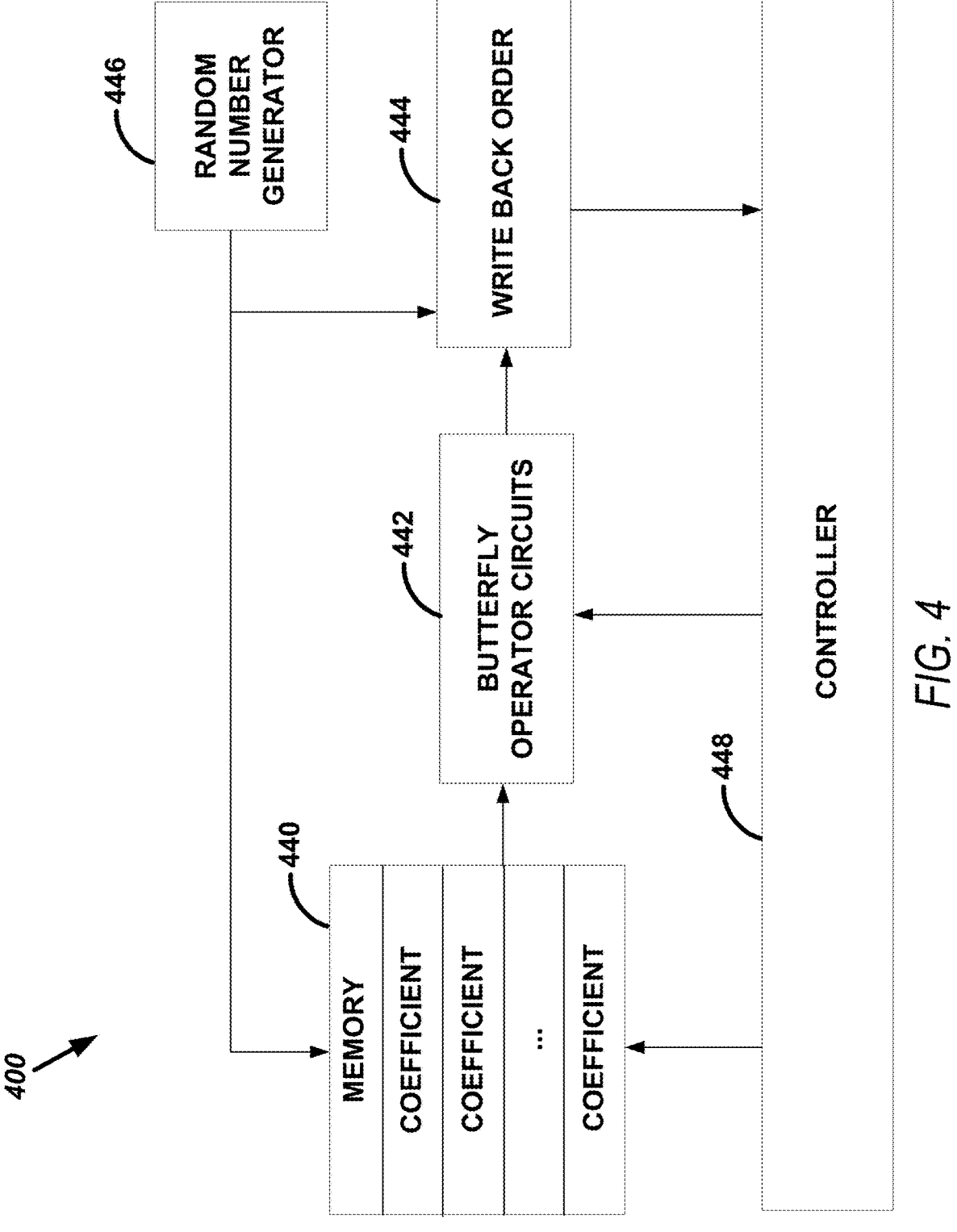
FIG. 4 illustrates, by way of example, a diagram of an embodiment of a circuit for shuffling input coefficients at each stage of butterfly operator circuit operations.

FIG. 4 illustrates, by way of example, a diagram of an embodiment of a circuit 400 for shuffling input coefficients at each stage 332, 334, 336 of butterfly operator circuit operations. The circuit. 400 as illustrated includes a memory 440 that stores the coefficients 330 that are to be converted to NTT domain or out of NTT domain using butterfly operator circuits 442. The butterfly operator circuits 442 can be configured as GS or CT butterfly operator circuits. The butterfly operator circuits can be implemented using the circuits 100, 200. A random number generator (RNG) 446 can select a starting input index for the coefficients 330 to be provided to the butterfly operator circuits 442. Since the input index is randomized, by the RNG 446, the order of the inputs should be monitored, such as by a controller 448, so as to keep NTT or INTT operations accurate. A write back order circuit 444 can thus be used, by the controller 448 or implemented by the controller 448, to control the order of the coefficients 330. The controller 448 monitors the write back order 444 and writes output from the butterfly operator circuits 442 back to the memory 440 in accord with the order indicated by the write back order 444.

The circuit 400 randomizes the order of coefficients at every stage 332, 334, 336. FIG. 3 shows that an in-order NTT performs butterfly operations on the coefficients as:

Stage #1, stage 332: $0^{th}$: (0, 4), $1^{st}$:(1, 5), $2^{nd}$:(2, 6), $3^{rd}$:(3, 7)

Stage #2, stage 334: $0^{th}$: (0, 2), $1^{st}$:(1, 3), $2^{nd}$:(4, 6), $3^{rd}$:(5, 7)

Stage #3, stage 336: $0^{th}$: (0, 1), $1^{st}$:(2, 3), $2^{nd}$:(4, 5), $3^{rd}$:(6, 7)

To introduce randomness, the RNG 446 selects a random number "r" ranging from 0 to BLC-1. This number determines the pair selection used for butterfly operations, altering the execution order. The new execution order follows the formula (current index+r) mod(BLC).

For example, consider the following:

The random number is 2 for the first stage and BLC is 4. Since order follows ((0th+2)% mod 4=2nd), ((1st+2)% mod 4=3rd), ((2nd+2)% mod 4=0th), ((3rd+2)% mod 4=1st), the execution order becomes as given: $2^{nd}$:(2, 6), $3^{rd}$:(3, 7), $0^{th}$:(0, 4), 1st:(1, 5), rather than 0': (0, 4), 1st:(1, 5), $2^{nd}$:(2, 6), $3^{rd}$:(3, 7)

This example illustrates a case where the randomization is achieved with one random number. Therefore, the attacker needs to find this random number in order to obtain the execution order. Since the random number is uniformly sampled over a field ranging from 0 to BLC-1, the search space is determined with size of BLC.

However, the shuffling technique using the circuit 400 also offers multiple randomizations in one block. For example, a CRSYTAL-Dilithium algorithm works with polynomials having 256 coefficients. Therefore, the first stage of NTT still has one block, but BLC is 128 for the first state, while the second stage's BLC is 64.

One can segregate every block into smaller chunks and number of chunks can be represented with "CH". For instance, the first stage of CRSYTAL-Dilithium NTT could have 4 chunks and each chunk could have 32 butterfly operations. It means that CH is 4, while BLC becomes 32. Instead of choosing one random number, one can choose CH number of random numbers, and each can be sampled uniformly in space ranging 0 to BLC-1. This makes new search space BLC^CH. BLC can be chosen to be only a power of two ("2"), such as to enable uniform sampling without requiring an additional circuit to perform modulo operation.

The circuit 400 has the memory 440 that stores a set of coefficients 330 being processed with butterfly operator circuits 442. These coefficients 330 can belong to any stage of NTT or INTT, while the butterfly operator circuits 442 include one or more butterfly processing circuits 100, 200. Since every stage 332, 334, 336 has a different number of blocks and also the circuit 400 proposes a smaller granularity in blocking, the controller 448 manages and decides number of chunks and BLC number in a chunk. The controller 448 also forwards the randomized order information to the write back order circuit 444 that provides the paired coefficients to a proper address in the memory 440.

Shuffling in NTT and INTT aims to randomize the starting coefficient pair to be executed and then follows in-order execution from then on. Note that shuffling does not change a result, but instead changes the order of operation. This gives a search space of 4 per stage in the above example. An example shuffled order of execution is as follows.

Stage 1: (2, 6), (3, 7), (0, 4), (1, 5)→starting address is 2
Stage 2: (1, 3), (4, 6), (5, 7), (0, 2)→starting address is 1
Stage 3: (6, 7), (0, 1), (2, 3), (4, 5)→starting address is 6

Assuming an NTT operation with 256 coefficients, 4 coefficients per memory address, an iteration of NTT requires 64 memory accesses per operation. Assuming a customized memory access pattern to resolve NTT memory conflicts, 64 addresses can be divided into 4 chunks of addresses where the start address is randomized and chunk order is also randomized. In this case, the search space is limited to $4^5$ for NTT. Similarly for INTT, the 64 addresses can be divided into 16 chunks due to the memory access pattern restriction, where the start address of each chunk is randomized. This means the search space for INTT is limited to 16. Such small search spaces result in weak countermeasures and NTT or INTT operations can leak information.

Figure 5:
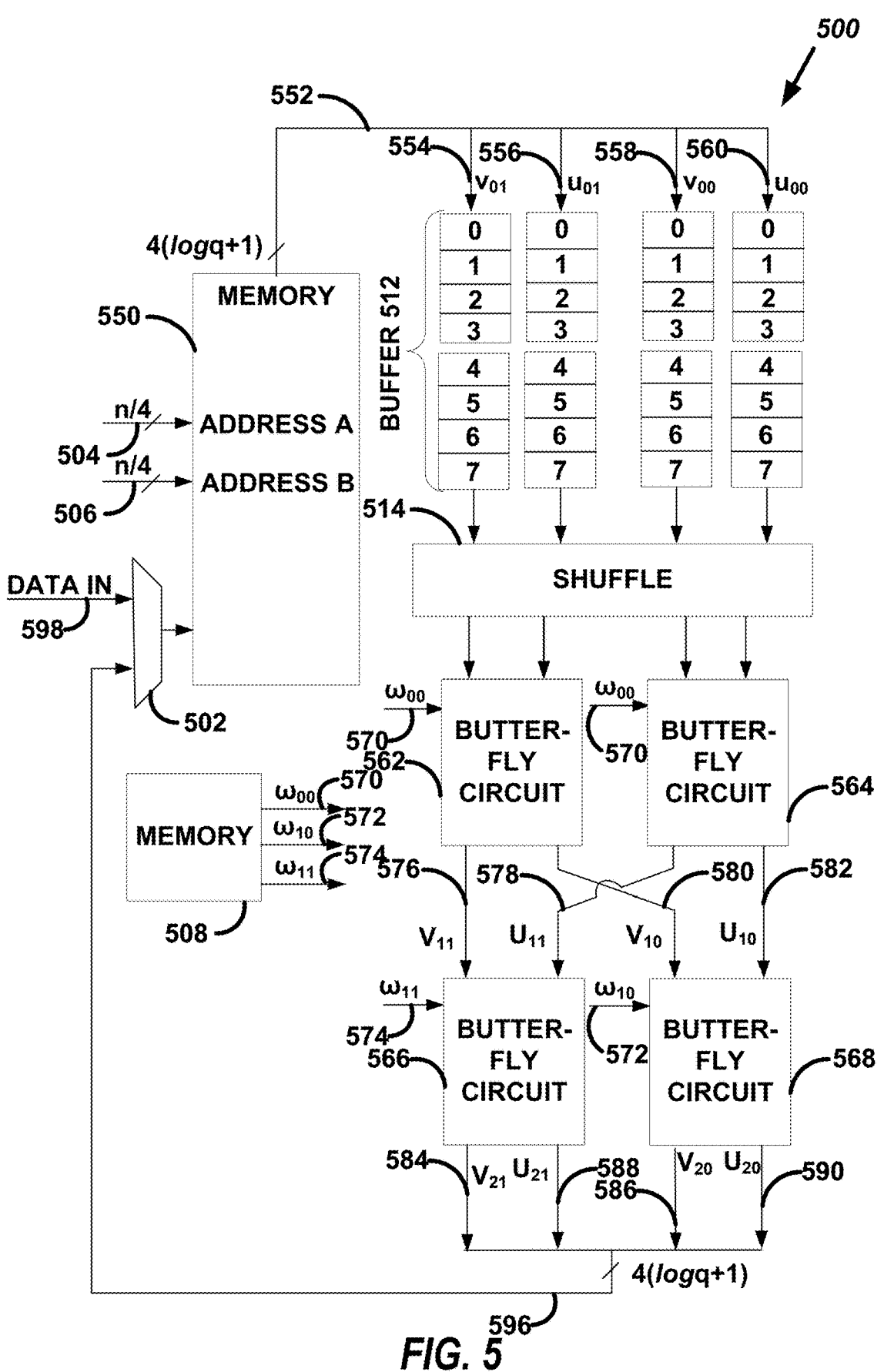
FIG. 5 illustrates, by way of example, a diagram of an embodiment of a circuit that improves security in performing NTT/INTT conversions.

To help shore up the leakage potential, a method is proposed to implement a custom buffer for NTT which leverages the random memory access pattern and allows to implement a shuffling mechanism on input coefficients and increases the NTT shuffling search space. For an NTT core with 64 memory accesses, with this technique, the 64 addresses can be divided into 16 randomized chunks of 4 addresses per chunk where each chunk is further randomized. Hence the search space is improved to $16 \times 4^{16} = 2^{36}$ giving an improvement of $2^{28}$ range. Moreover, with this technique, NTT and INTT operations have the same search space of $2^{36}$ which is a large improvement over a naïve shuffling implementation. FIG. 5 shows a block diagram of a circuit configured to perform NTT with a custom buffer and shuffle logic implementation.

FIG. 5 illustrates, by way of example, a diagram of an embodiment of a circuit 500 that improves security in performing NTT/INTT conversions. The circuit 500 as illustrated includes a memory 550 that provides coefficients and intermediate NTT/INTT conversion values 554, 556, 558, 550 (jointly coefficient or intermediate results 552) to butterfly circuits 562, 564, 566, 568, respectively. The butterfly circuits 562, 564 provide intermediate results 576, 578, 580, 582 to further butterfly circuits 566, 568. Results 584, 586, 588, 590 are provided to a multiplexer 502. The multiplexer 502 selects output 596 entries or data in 598 (polynomial coefficients) to be written to the memory 550 for NTT/INTT conversion.

The memory 550 can include a random access memory (RAM). The memory 550 allows one to read data 504, 506 which is four polynomial coefficients or intermediate values, in a single clock cycle. The memory 550 allows one to write data 596, which is four NTT/INTT converted coefficients or intermediate values, in a single clock cycle. Each of the memory addresses can store two or four values concatenated. The values 554, 556, 558, 560 can be inputs for one or two butterfly circuits 562, 564. In a single memory read cycle from the memory 550, the butterfly circuit 562 can receive values 554 and 556 as input and the butterfly circuit 564 can receive values 558, 560 as input. In a single memory read cycle from the twiddle factor memory 508, the butterfly circuits 562, 564 can receive a twiddle factor 570. In a single memory read cycle from the twiddle factor memory 508, the butterfly circuits 566, 568 can receive twiddle factors 574, 572, respectively.

The butterfly circuits 562, 564, 566, 568 can be configured as one of the butterfly circuits 100, 200. The butterfly circuits 562 and 564 are electrically situated in parallel. The butterfly circuits 566, 568 are electrically situated in parallel. The butterfly circuit 562 is electrically situated in series with the butterfly circuit 566. The butterfly circuit 562 is electrically situated in series with the butterfly circuit 568. The butterfly circuit 564 is electrically situated in series with the butterfly circuit 566. The butterfly circuit 564 is electrically situated in series with the butterfly circuit 568.

The butterfly circuits 562, 564 operate on the values 554, 556, 558, 560 in one clock cycles to generate values 576, 578, 580, 582. The butterfly circuit 566 receives value 576 from the butterfly circuit 562 and the value 578 from the butterfly circuit 564. The butterfly circuit 568 receives value 580 from the butterfly circuit 562 and the value 582 from the butterfly circuit 564. The butterfly circuit 566 operates on the values 576 and 578, along with twiddle factor 574 to generate values 584, 588. The butterfly circuit 568 operates on the values 580, 582, along with the twiddle factor 572 to generate values 586, 590. The values 584, 586, 588, and 590 can be stored in the memory 550.

Using the circuit 500, four coefficients are fetched from memory and sent to butterfly circuits 562, 564 in each clock cycle. The multiplexer 502 can provide either raw coefficient data as data in 598 to the memory 550 or can provide the values 596 to the memory 440.

The twiddle factor memory 508 is a read only memory (ROM) that stores the twiddle factors 570, 572, 574 relevant for operation of the butterfly circuits 562, 564, 566, 568.

A buffer 512 stores chunk-sized blocks of input coefficients. A shuffle circuit 512 selects coefficients from the buffer 512 and provides selected coefficients to the butterfly operator circuits 562, 564. More details of a possible hardware implementation of the shuffle circuit 512 are provided in FIG. 6.

The circuit 500 provides a pure hardware NTT/INTT architecture that offers higher security than prior NTT/INTT circuits. The circuit 500 enables one to design a mergedlayer hardware architecture of NTT/INTT operation that can be optimized and mapped to a field programmable gate array (FPGA) or application specific integrated circuit (ASIC) platform to develop a high-performance post-quantum cryptography (PQC) architecture.

In operating the circuit 500, the inputs to the butterfly circuits 562, 564 can be chosen such that after each of the butterfly circuits 566, 568 provides a first output the intermediate values required to determine a[0] in the stage 336 are known. This means that a[0] and a[4] from stage 332 are provided as input to the butterfly circuit 562 and that a[2] and a[6] are provided to the butterfly circuit 564. Then, after a second output is received from the butterfly circuits 566, 568 the intermediate values required to determine a[2] at the stage 334 are known by reverse engineering the inputs required. And so on. Thus, the inputs are reverse engineered so that data latency is reduced as compared to other solutions discussed elsewhere. The circuit 500 operating in this way may be referred to as a "hybrid pipelined-serial-parallel" architecture.

During an NTT operation on a first selected chunk of coefficients, coefficients from the memory 550 are accumulated in the buffer 512. After accumulation, NTT processes each vertical buffer section in one cycle as shown in the FIG. 5. The selection of the coefficient chunk in the starting vertical buffer is randomized. After the random vertical buffer is selected, next coefficients are selected in order and wrapped around to finish operating on all four vertical buffer portions. After the latency of the butterfly operator circuits 562, 564, 566, 568 has lapsed, valid outputs 596 are written to the memory 550.

Coefficients of the next chunk can be read from memory 550 while the data in a given portion of the buffer 512 is being processed by the butterfly operator circuits 562, 564, 566, 568. To avoid data corruption, two buffer portions that can hold coefficients for a round of butterfly operator circuit 562, 564, 566, 568 operations can be used. While one buffer portion is being read from, the other buffer portion can be written to and vice versa, creating a ping pong pattern of buffer usage. This way, the pipeline requirements of NTT and can be achieved along with a strong countermeasure with no latency impact and minimal area overhead.

Similarly, for INTT operation, the buffer 512 is connected to the output side of the butterfly operator circuits 562, 564, 566, 568. Shuffling can take place at the input side where the memory 550 is read with the randomized start address and executed in the same order. Results are accumulated in the buffer 512 and are populated in the randomized order. After four coefficients are accumulated, the coefficients are written back to memory 550 in order, as a normal INTT operation.

Figure 6:
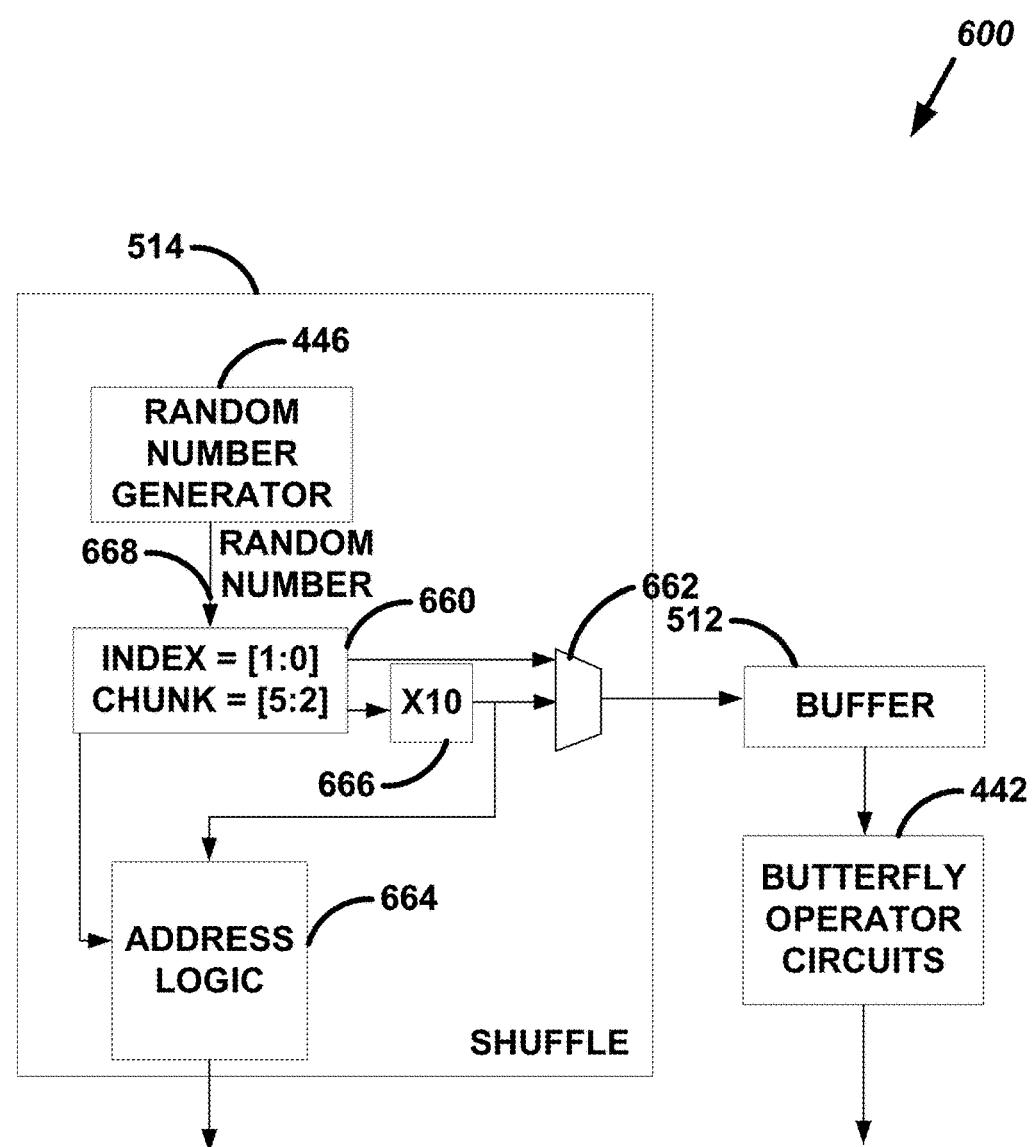
FIG. 6 illustrates, by way of example, a diagram of an embodiment of a circuit that includes the shuffler of FIG. 5 and some surrounding electrical components.

FIG. 6 illustrates, by way of example, a diagram of an embodiment of a circuit 600 that includes the shuffler 514 and some surrounding electrical components. The circuit 600 as illustrated includes the shuffler 514, the RNG 446, the buffer 512, and the butterfly operator circuits 442. The RNG 446 generates a random number 668. Six bits of the random number 668 are used, by an operator 660, to determine an index and a chunk into the addresses of the coefficients in the memory 550. The index and the chunk are delayed by a number of cycles required for controller 446 logic operations. A multiplexer 662 selects between delayed and undelayed versions of index and chunk. The shuffler 514 provides the data corresponding to the chunk and the address to the buffer 512. The address logic 664 determines the address to be retrieved and stored in the buffer 512 based on the index and chunk.

The index and chunk are obtained from a random number source. Chunk refers to starting chunk number and index refers to start address within the selected chunk. To account for butterfly operator circuit 442 latency, the index and chunk must be delayed appropriately (for our design, this latency is 10 cycles) for use in the controller shuffler logic.

The general address calculation for NTT is:

$$\text{mem read addr} = \text{chunk} + (\text{count}_{regular} * \text{STEP}_{rd})$$

Since reading memory can be in order, a regular counter is used to read all 4 addresses of the selected chunk.

$$\text{mem write addr} = (\text{chunk}_{f10} * 4) + (\text{index}_{f10} * \text{STEP}_{wr})$$

The buffer address calculation for NTT is:

$$\text{buffer write addr} = \text{count}_{regular}$$

$$\text{buffer read addr} = \text{count}_{index}$$

Where f10 refers to delayed values by 10 cycles. In this logic, chunk is updated every 4 cycles and buffer pointer is toggled (to different portions of the buffer) every 4 cycles.

The general address calculation for INTT is:

$$\text{mem read addr} = (\text{chunk} * 4) + (\text{index} * \text{STEP}_{rd})$$

$$\text{mem write addr} = (\text{chunk}_{f10}) + (\text{count}_{regular} * \text{STEP}_{wr})$$

Since writing to memory can be in order, a regular counter is used to write all 4 addresses of the selected chunk.

In INTT, index need not be delayed since the BFs consume the coefficients in the next cycle.

The buffer address calculation for INTT is:

$$\text{buffer write addr} = \text{index}_{f10}$$

$$\text{buffer read addr} = \text{count}_{regular}$$

Shuffling Examples

Assume an unprotected NTT operation reads memory in the following read address pattern:

0, 16, 32, 48, 1, 17, 33, 49, 2, 18, 34, 50 . . .

Memory writes occur in address order as follows:

0, 1, 2, 3, 4, 5, 6, 7, 8, 9, 10, 11, 12, 13, 14 . . .

The shuffling follows this unique memory access pattern, just not in chronological order, such as to avoid memory conflicts and optimize memory accesses for NTT and INTT operations. This shuffling avoids extra overhead required to restructure the memory 550 after every NTT operation so that the data is ready to be consumed by INTT operation. With this memory access pattern, there is no data dependency for either reads or writes. This holds true with the buffer 512 and shuffle circuit 514 avoiding latency overhead and ensures the countermeasure gives high security with low complexity.

To keep the memory accesses true to the random pattern, in a naïve implementation, the 64 addresses can be divided into 4 chunks as shown in the table below. Between these 4 chunks, chunk order can be randomized and within the selected chunk, start address can be randomized. For example, order of access now becomes:

(10, 26, 42, 58), (11, 27, 43, 59), (12, 28, 44, 60), (13, 29, 45, 61), (14, 30, 46, 62), (15, 31, 47, 63), (0, 16, 32, 48), (1, 17, 33, 49), (2, 18, 34, 50), (3, 19, 35, 51), (4, 20, 36, 52), (5, 21, 37, 53), (6, 22, 38, 54), (7, 23, 39, 55), (8, 24, 40, 56), (9, 25, 41, 57)

Here, the chunk being executed is randomized as well as the start address within that chunk. After the start address is calculated, addresses are processed in order from that selected start address and wrapped around to finish executing the rest of the addresses within the selected chunk. By following this method, search space for an attacker is $4 \times 4^4 = 4^5 = 1024$ which is quite small.

| Address | Memory Content | | | | Chunk |
|---|---|---|---|---|---|
| 0 | 0 | 1 | 2 | 3 | 0 |
| 1 | 4 | 5 | 6 | 7 | |
| 2 | 8 | 9 | 10 | 11 | |
| 3 | 12 | 13 | 14 | 15 | |
| 4 | 16 | 17 | 18 | 19 | |
| 5 | 20 | 21 | 22 | 23 | |
| 6 | 24 | 25 | 26 | 27 | |
| 7 | 28 | 29 | 30 | 31 | |
| 8 | 32 | 33 | 34 | 35 | |
| 9 | 36 | 37 | 38 | 39 | |
| 10 | 40 | 41 | 42 | 43 | |
| 11 | 44 | 45 | 46 | 47 | |
| 12 | 48 | 49 | 50 | 51 | |
| 13 | 52 | 53 | 54 | 55 | |
| 14 | 56 | 57 | 58 | 59 | |
| 15 | 60 | 61 | 62 | 63 | |
| 16 | 64 | 65 | 66 | 67 | 1 |
| 17 | 68 | 69 | 70 | 71 | |
| 18 | 72 | 73 | 74 | 75 | |
| 19 | 76 | 77 | 78 | 79 | |
| 20 | 80 | 81 | 82 | 83 | |
| 21 | 84 | 85 | 86 | 87 | |
| 22 | 88 | 89 | 90 | 91 | |
| 23 | 92 | 93 | 94 | 95 | |
| 24 | 96 | 97 | 98 | 99 | |
| 25 | 100 | 101 | 102 | 103 | |
| 26 | 104 | 105 | 106 | 107 | |
| 27 | 108 | 109 | 110 | 111 | |
| 28 | 112 | 113 | 114 | 115 | |
| 29 | 116 | 117 | 118 | 119 | |
| 30 | 120 | 121 | 122 | 123 | |
| 31 | 124 | 125 | 126 | 127 | |
| 32 | 128 | 129 | 130 | 131 | 2 |
| 33 | 132 | 133 | 134 | 135 | |
| 34 | 136 | 137 | 138 | 139 | |
| 35 | 140 | 141 | 142 | 143 | |
| 36 | 144 | 145 | 146 | 147 | |
| 37 | 148 | 149 | 150 | 151 | |
| 38 | 152 | 153 | 154 | 155 | |
| 39 | 156 | 157 | 158 | 159 | |
| 40 | 160 | 161 | 162 | 163 | |
| 41 | 164 | 165 | 166 | 167 | |
| 42 | 168 | 169 | 170 | 171 | |
| 43 | 172 | 173 | 174 | 175 | |
| 44 | 176 | 177 | 178 | 179 | |
| 45 | 180 | 181 | 182 | 183 | |
| 46 | 184 | 185 | 186 | 187 | |
| 47 | 188 | 189 | 190 | 191 | |
| 48 | 192 | 193 | 194 | 195 | 3 |
| 49 | 196 | 197 | 198 | 199 | |
| 50 | 200 | 201 | 202 | 203 | |
| 51 | 204 | 205 | 206 | 207 | |
| 52 | 208 | 209 | 210 | 211 | |
| 53 | 212 | 213 | 214 | 215 | |
| 54 | 216 | 217 | 218 | 219 | |
| 55 | 220 | 221 | 222 | 223 | |
| 56 | 224 | 225 | 226 | 227 | |
| 57 | 228 | 229 | 230 | 231 | |
| 58 | 232 | 233 | 234 | 235 | |
| 59 | 236 | 237 | 238 | 239 | |
| 60 | 240 | 241 | 242 | 243 | |
| 61 | 244 | 245 | 246 | 247 | |
| 62 | 248 | 249 | 250 | 251 | |
| 63 | 252 | 253 | 254 | 255 | |

Here, the chunks can be rearranged and the order of execution is randomized to maximize the search space. Here, the chunks can be formed as shown in the memory content example below.

| Address | Memory Content | | | | Chunk |
|---|---|---|---|---|---|
| 0 | 0 | 1 | 2 | 3 | 0 |
| 16 | 64 | 65 | 66 | 67 | |
| 32 | 128 | 129 | 130 | 131 | |
| 48 | 192 | 193 | 194 | 195 | |
| 1 | 4 | 5 | 6 | 7 | 1 |
| 17 | 68 | 69 | 70 | 71 | |
| 33 | 132 | 133 | 134 | 135 | |
| 49 | 196 | 197 | 198 | 199 | |
| 2 | 8 | 9 | 10 | 11 | 2 |
| 18 | 72 | 73 | 74 | 75 | |
| 34 | 136 | 137 | 138 | 139 | |
| 50 | 200 | 201 | 202 | 203 | |
| 3 | 12 | 13 | 14 | 15 | 3 |
| 19 | 76 | 77 | 78 | 79 | |
| 35 | 140 | 141 | 142 | 143 | |
| 51 | 204 | 205 | 206 | 207 | |
| 4 | 16 | 17 | 18 | 19 | 4 |
| 20 | 80 | 81 | 82 | 83 | |
| 36 | 144 | 145 | 146 | 147 | |
| 52 | 208 | 209 | 210 | 211 | |
| 5 | 20 | 21 | 22 | 23 | 5 |
| 21 | 84 | 85 | 86 | 87 | |
| 37 | 148 | 149 | 150 | 151 | |
| 53 | 212 | 213 | 214 | 215 | |
| 6 | 24 | 25 | 26 | 27 | 6 |
| 22 | 88 | 89 | 90 | 91 | |
| 38 | 152 | 153 | 154 | 155 | |
| 54 | 216 | 217 | 218 | 219 | |
| 7 | 28 | 29 | 30 | 31 | 7 |
| 23 | 92 | 93 | 94 | 95 | |
| 39 | 156 | 157 | 158 | 159 | |
| 55 | 220 | 221 | 222 | 223 | |
| 8 | 32 | 33 | 34 | 35 | 8 |
| 24 | 96 | 97 | 98 | 99 | |
| 40 | 160 | 161 | 162 | 163 | |
| 56 | 224 | 225 | 226 | 227 | |
| 9 | 36 | 37 | 38 | 39 | 9 |
| 25 | 100 | 101 | 102 | 103 | |
| 41 | 164 | 165 | 166 | 167 | |
| 57 | 228 | 229 | 230 | 231 | |
| 10 | 40 | 41 | 42 | 43 | 10 |
| 26 | 104 | 105 | 106 | 107 | |
| 42 | 168 | 169 | 170 | 171 | |
| 58 | 232 | 233 | 234 | 235 | |
| 11 | 44 | 45 | 46 | 47 | 11 |
| 27 | 108 | 109 | 110 | 111 | |
| 43 | 172 | 173 | 174 | 175 | |
| 59 | 236 | 237 | 238 | 239 | |
| 12 | 48 | 49 | 50 | 51 | 12 |
| 28 | 112 | 113 | 114 | 115 | |
| 44 | 176 | 177 | 178 | 179 | |
| 60 | 240 | 241 | 242 | 243 | |
| 13 | 52 | 53 | 54 | 55 | 13 |
| 29 | 116 | 117 | 118 | 119 | |
| 45 | 180 | 181 | 182 | 183 | |
| 61 | 244 | 245 | 246 | 247 | |
| 14 | 56 | 57 | 58 | 59 | 14 |
| 30 | 120 | 121 | 122 | 123 | |
| 46 | 184 | 185 | 186 | 187 | |
| 62 | 248 | 249 | 250 | 251 | |
| 15 | 60 | 61 | 62 | 63 | 15 |
| 31 | 124 | 125 | 126 | 127 | |
| 47 | 188 | 189 | 190 | 191 | |
| 63 | 252 | 253 | 254 | 255 | |

In this technique, the memory contents are organized into 16 chunks in such a way that first chunk has addresses 0, 16, 32, 48. Second chunk has 1, 17, 33, 49, etc. Chunk order is randomized and order of execution within the chunk is further randomized. This brings the search space to $16 \times 4^{16} = 24 \times 2^{32} = 2^{36} = 68,719,476,736$. Shuffling only pertains to execution in NTT and writeback to memory must be in order to ensure correct processing order for inverse NTT operation.

For example, if chunk 5 is selected as the starting chunk, the custom buffer in NTT mode is configured as below.

| | | | |
|---|---|---|---|
| $215^1$ | $214^0$ | $213^3$ | $212^2$ |
| $151^1$ | $150^0$ | $149^3$ | $148^2$ |
| $87^1$ | $86^0$ | $85^3$ | $84^2$ |
| $23^1$ | $22^0$ | $21^3$ | $20^2$ |

The order of execution is shown by superscripts in the table and is randomized for that chunk. While the coefficients in the bottom half of the custom buffer are processed, the next chunk is loaded into the top half in a pipelined implementation of NTT.

For inverse NTT (INTT), execution is in order and writeback to memory is out of order. To write back results while keeping search space large, we propose a custom buffer and custom addressing logic. The buffer 512 keeps track of the coefficients being processed and stores them in the correct order accounting for randomization. After 4 coefficients have been written to the buffer 512, the corresponding addresses are written over in the memory 550 while the next set of coefficients are populated in the second section of the buffer 512.

Similar to NTT, for INTT chunk order can be randomized and the start address in each chunk can also randomized. This brings the search space to $16 \times 4^{16} = 2^{36} = 68,719,476,736$.

For example, if chunk 5 is selected as the starting chunk, and start address is 1, the order of execution is (21, 22, 23, 20). The custom buffer in INTT mode is configured as below. The buffer write pointer is aligned with the start address of the selected chunk and wraps around. In the given example, buffer write pointer increments as (1, 2, 3, 0) and the outputs of butterfly2×2 are stored in the buffer in locations (1, 2, 3, 0) in the order shown by superscript in the table below. This ensures the correct data is written back to memory to the correct addresses. In INTT mode, memory reads are randomized and memory writes will be in order.

| | | | |
|---|---|---|---|
| $95^2$ | $94^2$ | $93^2$ | $92^2$ |
| $91^1$ | $90^1$ | $89^1$ | $88^1$ |
| $87^0$ | $86^0$ | $85^0$ | $84^0$ |
| $83^3$ | $82^3$ | $81^3$ | $80^3$ |

While the next chunk starts, the data in the bottom half of the buffer is written to memory while the next chunk's output data is written to the top half of the buffer.

To protect NTT from SCA attacks, masking may be implemented with an area overhead of at least 4× and at least 4× increase in latency. Shuffling methods can be implemented for NTT but the search space must be large enough to mitigate SCA attacks. A custom buffer implementation for NTT and INTT that supports randomized order of execution of random chunks in memory during NTT and INTT operations is presented. The use of this buffer in INTT mode improves search space from 16 to $2^{36}$ and requires minimal additional area and has no latency overhead, while achieving a significantly higher level of security and keeping the complexity low.

FIG. 7 illustrates, by way of example, a block diagram of an embodiment of a method 700 for NTT/INTT with improved security. The method 700 as illustrated includes storing, at a memory, polynomial coefficients, at operation 770; control, by a controller coupled to the memory, which of the polynomial coefficients are read from the memory, at operation 772; shuffling, by a shuffle circuit coupled between the memory and butterfly operator circuits, an order in which the polynomial coefficients are provided to the butterfly operator circuits, at operation 774; receiving, by the butterfly operator circuits, the polynomial coefficients, a first subset of the butterfly operator circuits situated in series with each other and in parallel with a second subset of the butterfly operator circuits, at operation 776; generating, after iterations of operating on the polynomial coefficients by the butterfly operator circuits, transformed coefficients as outputs, at operation 778; and controlling, by the controller, which addresses of the memory are written to and store the outputs, including the transformed coefficients, at operation 780.

The method 700 can further include storing, at a buffer, the polynomial coefficients in shuffled order. The buffer can include a number of entries, the number of entries sufficient to store polynomial coefficients for multiple iterations of operating the butterfly operator circuits.

The method 700 can further include generating, by a random number generator, a random number, wherein the shuffle circuit uses the random number to determine the order in which the polynomial coefficients are provided to the butterfly operator circuits. The memory can store a plurality of polynomial coefficients in each address thereof and the method further comprises selecting, by the shuffle circuit and based on the random number, which address of polynomial coefficients is provided to the butterfly operator circuits.

The method 700 can further include selecting, by the shuffle circuit and based on the random number, the order in which each polynomial coefficient of the polynomial coefficients is provided to the butterfly operator circuits. The method 700 can further include delaying, by a delay component of the shuffle circuit, the random number by a specified number of clock cycles. The specified number of clock cycles is greater than, or equal to, number of clock cycles used by the butterfly operator circuits in generating an output.

FIG. 8 illustrates, by way of example, a block diagram of an embodiment of a machine 800 (e.g., a computer system) to implement one or more embodiments. The machine 800 can implement the circuit 100, 200, stage 332, 334, 336, butterfly operator circuits 442, write back order operator 444, random number generator 446, controller 448, shuffle circuit 514, butterfly operator circuit 562, 564, 566, 568, delay component 666, address logic 664, operator 660, method 700, or a component or operation thereof can include one or more of the components of the machine 800. One or more of the circuit 100, 200, stage 332, 334, 336, butterfly operator circuits 442, write back order operator 444, random number generator 446, controller 448, shuffle circuit 514, butterfly operator circuit 562, 564, 566, 568, delay component 666, address logic 664, operator 660, method 700, or a component or operations thereof can be implemented, at least in part, using a component of the machine 800. One example machine 800 (in the form of a computer), may include a processing unit 802, memory 803, removable storage 810, and non-removable storage 812. Although the example computing device is illustrated and described as machine 800, the computing device may be in different forms in different embodiments. For example, the computing device may instead be a smartphone, a tablet, smartwatch, or other computing device including the same or similar elements as illustrated and described regarding FIG. 8. Devices such as smartphones, tablets, and smartwatches are generally collectively referred to as mobile devices. Further, although the various data storage elements are illustrated as part of the machine 800, the storage may also or alternatively include cloud-based storage accessible via a network, such as the Internet.

Memory 803 may include volatile memory 814 and non-volatile memory 808. The machine 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 800 may include or have access to a computing environment that includes input 806, output 804, and a communication connection 816. Output 804 may include a display device, such as a touchscreen, that also may serve as an input device. The input 806 may include one or more of a touchscreen, touchpad, mouse, keyboard, camera, one or more device-specific buttons, one or more sensors integrated within or coupled via wired or wireless data connections to the machine 800, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 802 (sometimes called processing circuitry) of the machine 800. A hard drive, CD-ROM, and RAM are some examples of articles including a non-transitory computer-readable medium such as a storage device. For example, a computer program 818 may be used to cause processing unit 802 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

ADDITIONAL NOTES AND EXAMPLES

Example 1 includes a circuit for number theoretic transform (NTT) or inverse NTT (INTT) comprising a memory configured to store polynomial coefficients, butterfly operator circuits coupled to receive the polynomial coefficients and generate, after iterations of operating on the polynomial coefficients, transformed coefficients as outputs, a first subset of the butterfly operator circuits situated in series with each other and in parallel with a second subset of the butterfly operator circuits, and a shuffle circuit coupled between the memory and the butterfly operator circuits, the shuffle circuit configured to change an order in which the polynomial coefficients are provided to the butterfly operator circuits.

In Example 2, Example 1 includes a buffer situated to store the polynomial coefficients in shuffled order.

In Example 3, Example 2 further includes, wherein the buffer includes a number of entries, the number of entries sufficient to store polynomial coefficients for multiple iterations of operating the butterfly operator circuits.

In Example 4, at least one of Examples 1-3 further includes a random number generator configured to generate a random number, wherein the shuffle circuit uses the random number to determine the order in which the polynomial coefficients are provided to the butterfly operator circuits.

In Example 5, Example 4 further includes, wherein the memory stores a plurality of polynomial coefficients in each address thereof, the shuffle circuit is configured to select, based on the random number, which address of polynomial coefficients is provided to the butterfly operator circuits.

In Example 6, Example 5 further includes, wherein the shuffle circuit is further configured to select, based on the random number, the order in which each polynomial coefficient of the polynomial coefficients is provided to the butterfly operator circuits.

In Example 7, at least one of Examples 4-6 further includes, wherein the shuffle circuit includes a delay component configured to delay the random number by a specified number of clock cycles.

In Example 8, Example 7 further includes, wherein the specified number of clock cycles is greater than, or equal to, number of clock cycles used by the butterfly operator circuits in generating an output.

In Example 9, at least one of Examples 1-8 further includes a controller coupled to the memory, the controller configured to control which coefficients are provided to the shuffle circuit and which addresses of the memory store the outputs.

Example 10 includes a method for number theoretic transform (NTT) or inverse NTT (INTT) comprising storing, at a memory, polynomial coefficients, controlling, by a controller coupled to the memory, which of the polynomial coefficients are read from the memory, shuffling, by a shuffle circuit coupled between the memory and butterfly operator circuits, an order in which the polynomial coefficients are provided to the butterfly operator circuits, receiving, by butterfly operator circuits, the polynomial coefficients, a first subset of the butterfly operator circuits situated in series with each other and in parallel with a second subset of the butterfly operator circuits, generating, after iterations of operating on the polynomial coefficients by the butterfly operator circuits, transformed coefficients as outputs, and controlling, by the controller, which addresses of the memory are written to and store the outputs, including the transformed coefficients.

In Example 11, Example 10 further includes storing, at a buffer, the polynomial coefficients in shuffled order.

In Example 12, Example 11 further includes, wherein the buffer includes a number of entries, the number of entries sufficient to store polynomial coefficients for multiple iterations of operating the butterfly operator circuits.

In Example 13, at least one of Examples 10-12 further includes generating, by a random number generator, a random number, wherein the shuffle circuit uses the random number to determine the order in which the polynomial coefficients are provided to the butterfly operator circuits.

In Example 14, Example 13 further includes, wherein the memory stores a plurality of polynomial coefficients in each address thereof and the method further comprises selecting, by the shuffle circuit and based on the random number, which address of polynomial coefficients is provided to the butterfly operator circuits.

In Example 15, Example 14 further includes selecting, by the shuffle circuit and based on the random number, the order in which each polynomial coefficient of the polynomial coefficients is provided to the butterfly operator circuits.

In Example 16, at least one of Examples 13-15 further includes delaying, by a delay component of the shuffle circuit, the random number by a specified number of clock cycles.

In Example 17, Example 16 further includes, wherein the specified number of clock cycles is greater than, or equal to, number of clock cycles used by the butterfly operator circuits in generating an output.

Example 18 includes a system for number theoretic transform (NTT) or inverse NTT (INTT) comprising a memory configured to store a plurality of polynomial coefficients in a plurality of addresses thereof, butterfly operator circuits coupled to receive the polynomial coefficients and generate, after iterations of operating on the polynomial coefficients, transformed coefficients as outputs, a first subset of the butterfly operator circuits situated in series with each other and in parallel with a second subset of butterfly operator circuits, a random number generator configured to generate a random number, a shuffle circuit coupled between the memory and the butterfly operator circuits, the shuffle circuit configured to select, based on the random number, which address of polynomial coefficients is provided to the butterfly operator circuits and an order in which each polynomial coefficient of the polynomial coefficients is provided to the butterfly operator circuits, and a controller coupled to the memory, the controller configured to control which coefficients are provided to the shuffle circuit and which addresses of the memory store the outputs.

In Example 19, Example 18 further includes a buffer situated to store the polynomial coefficients in shuffled order.

In Example 20, Example 19 further includes, wherein the buffer includes a number of entries, the number of entries sufficient to store polynomial coefficients for multiple iterations of operating the butterfly operator circuits.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A circuit for number theoretic transform (NTT) or inverse NTT (INTT) comprising:
   a memory configured to store polynomial coefficients in addresses thereof;
   butterfly operator circuits coupled to receive the polynomial coefficients and generate, after iterations of operating on the polynomial coefficients, transformed coefficients as outputs, a first subset of the butterfly operator circuits situated in series with each other and in parallel with a second subset of the butterfly operator circuits;
   a random number generator configured to generate a random number; and
   a shuffle circuit coupled between the memory and the butterfly operator circuits, the shuffle circuit configured to change, based on the random number, an order in which the polynomial coefficients are provided to the butterfly operator circuits including which address of polynomial coefficients is provided to the butterfly operator circuits.

2. The circuit of claim 1, further comprising a buffer situated to store the polynomial coefficients in shuffled order.

3. The circuit of claim 2, wherein the buffer includes a number of entries, the number of entries sufficient to store polynomial coefficients for multiple iterations of operating the butterfly operator circuits.

4. The circuit of claim 1, wherein the shuffle circuit is further configured to select, based on the random number, the order in which each polynomial coefficient of the polynomial coefficients is provided to the butterfly operator circuits.

5. The circuit of claim 1, wherein the shuffle circuit includes a delay component configured to delay the random number by a specified number of clock cycles.

6. The circuit of claim 5, wherein the specified number of clock cycles is greater than, or equal to, number of clock cycles used by the butterfly operator circuits in generating an output.

7. The circuit of claim 1 further comprising a controller coupled to the memory, the controller configured to control which coefficients are provided to the shuffle circuit and which addresses of the memory store the outputs.

8. A method for number theoretic transform (NTT) or inverse NTT (INTT) comprising:
   storing, at a memory and in addresses thereof, polynomial coefficients;
   controlling, by a controller coupled to the memory, which of the polynomial coefficients are read from the memory;
   generating, by a random number generator, a random number;
   shuffling, by a shuffle circuit coupled between the memory and butterfly operator circuits and based on the random number, an order in which the polynomial coefficients are provided to the butterfly operator circuits including which address of polynomial coefficients is provided to the butterfly operator circuits;
   receiving, by butterfly operator circuits, the polynomial coefficients, a first subset of the butterfly operator circuits situated in series with each other and in parallel with a second subset of the butterfly operator circuits;
   generating, after iterations of operating on the polynomial coefficients by the butterfly operator circuits, transformed coefficients as outputs; and controlling, by the controller, which addresses of the memory are written to and store the outputs, including the transformed coefficients.

9. The method of claim 8, further comprising storing, at a buffer, the polynomial coefficients in shuffled order.

10. The method of claim 9, wherein the buffer includes a number of entries, the number of entries sufficient to store polynomial coefficients for multiple iterations of operating the butterfly operator circuits.

11. The method of claim 8, further comprising selecting, by the shuffle circuit and based on the random number, the order in which each polynomial coefficient of the polynomial coefficients is provided to the butterfly operator circuits.

12. The method of claim 8, further comprising delaying, by a delay component of the shuffle circuit, the random number by a specified number of clock cycles.

13. The method of claim 12, wherein the specified number of clock cycles is greater than, or equal to, number of clock cycles used by the butterfly operator circuits in generating an output.

14. A system for number theoretic transform (NTT) or inverse NTT (INTT) comprising:

a memory configured to store a plurality of polynomial coefficients in a plurality of addresses thereof;

butterfly operator circuits coupled to receive the polynomial coefficients and generate, after iterations of operating on the polynomial coefficients, transformed coefficients as outputs, a first subset of the butterfly operator circuits situated in series with each other and in parallel with a second subset of the butterfly operator circuits;

a random number generator configured to generate a random number;

a shuffle circuit coupled between the memory and the butterfly operator circuits, the shuffle circuit configured to select, based on the random number, which address of polynomial coefficients is provided to the butterfly operator circuits and an order in which each polynomial coefficient of the polynomial coefficients is provided to the butterfly operator circuits; and a controller coupled to the memory, the controller configured to control which coefficients are provided to the shuffle circuit and which addresses of the memory store the outputs.

15. The system of claim 14, further comprising a buffer situated to store the polynomial coefficients in shuffled order.

16. The system of claim 15, wherein the buffer includes a number of entries, the number of entries sufficient to store polynomial coefficients for multiple iterations of operating the butterfly operator circuits.

* * * * *